E. W. CONNESS.
RESILIENT WHEEL.
APPLICATION FILED MAR. 30, 1918.

1,335,661.

Patented Mar. 30, 1920.
4 SHEETS—SHEET 1.

Inventor
E. W. Conness

Witness
L. B. James

By Victor J. Evans
Attorney

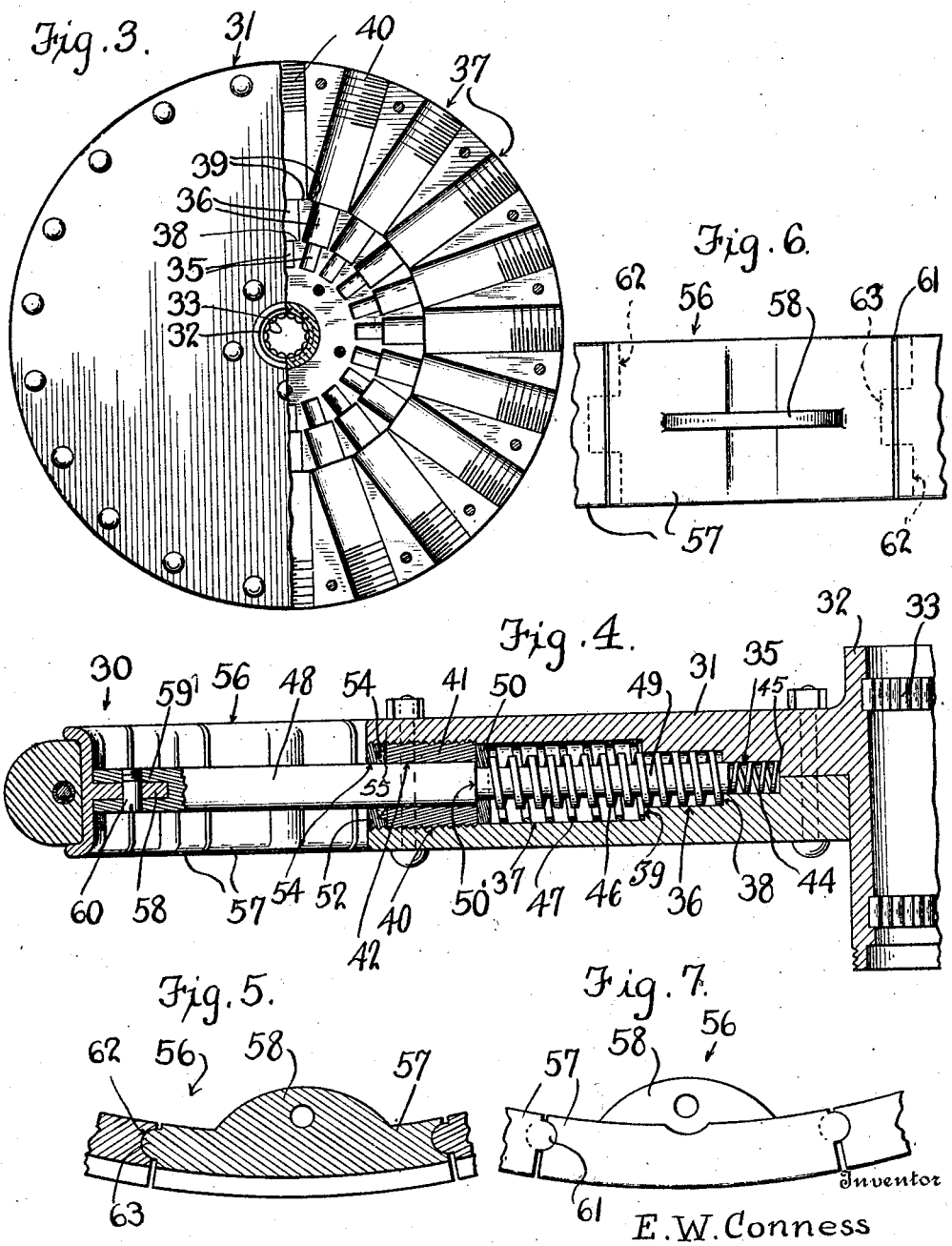

E. W. CONNESS.
RESILIENT WHEEL.
APPLICATION FILED MAR. 30, 1918.
1,335,661.
Patented Mar. 30, 1920.
4 SHEETS—SHEET 3.
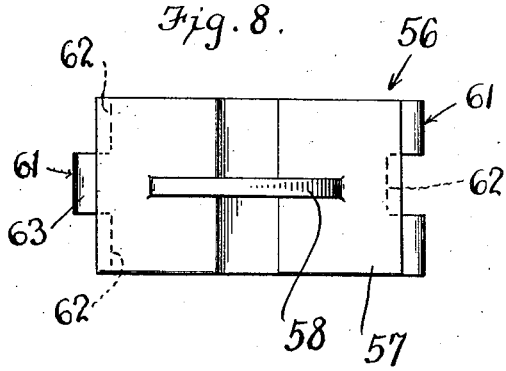
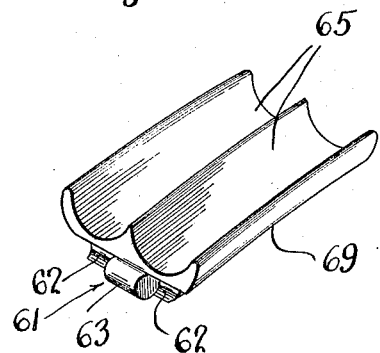
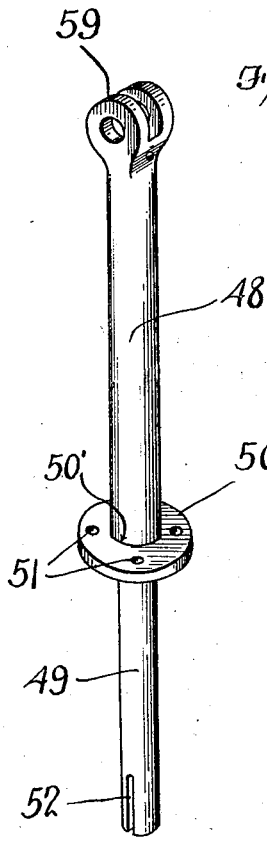
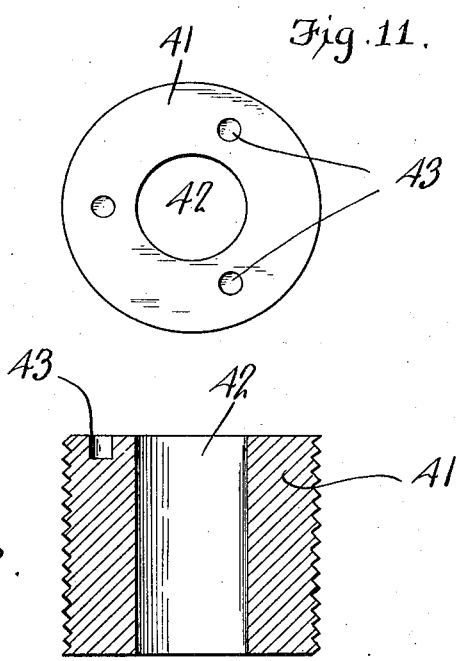
Inventor,
E. W. Conness
By Victor J. Evans
Attorney
Witnesses
L. B. James E. W. CONNESS.
RESILIENT WHEEL.
APPLICATION FILED MAR. 30, 1918.
1,335,661.
Patented Mar. 30, 1920.
4 SHEETS—SHEET 4.
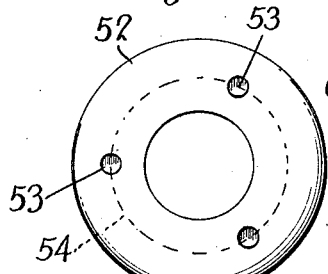
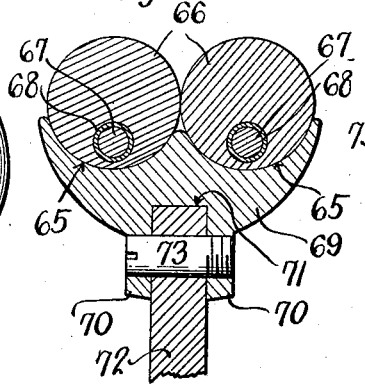
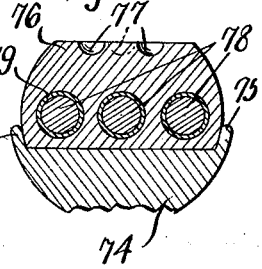
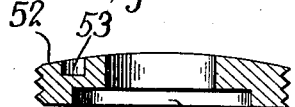
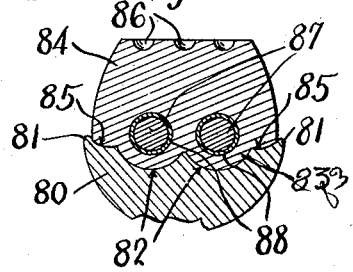
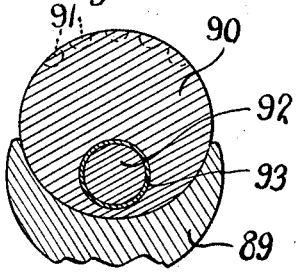
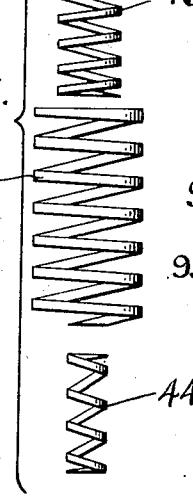
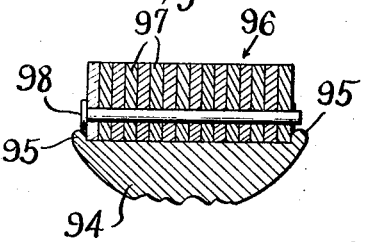
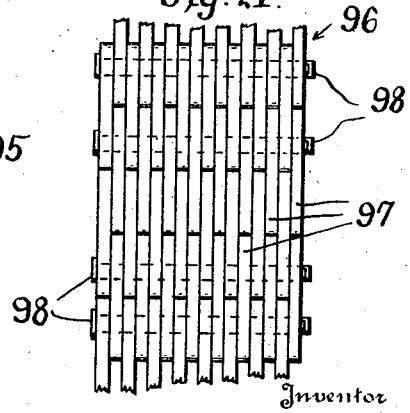
Witnesses
L. B. James
Inventor
E. W. Conness
By Victor J. Evans
Attorney

UNITED STATES PATENT OFFICE.

EDWARD W. CONNESS, OF KLAMATH FALLS, OREGON.

RESILIENT WHEEL.

1,335,661.  Specification of Letters Patent.  Patented Mar. 30, 1920.

Application filed March 30, 1918. Serial No. 225,737.

*To all whom it may concern:*

Be it known that I, EDWARD W. CONNESS, a citizen of the United States, residing at Klamath Falls, in the county of Klamath and State of Oregon, have invented new and useful Improvements in Resilient Wheels, of which the following is a specification.

This invention relates to wheels for vehicles, and its principal object is to produce a wheel which is resilient and capable of running over obstacles and rough surfaces in the same manner and with the same effect as wheels having pneumatic tires.

In carrying out my invention I produce a wheel in which the spokes are retained outward of the hub by the arrangement of springs arranged in the hub and exerting their tension against the spokes, the said spokes having their outer ends connected to a rim or shoe comprising a plurality of yieldable connected members, the said rim receiving a tread which is also of a yieldable nature, and thus produce a construction wherein all of the parts of the wheel are effectively cushioned to withstand the shocks and jars to which the same may be subjected.

Various other objects and advantages will appear as the nature of the invention is better understood, reference being had to the accompanying drawings, in which, Figure 1 is a side view of a wheel embodying my invention.

Fig. 3 is a view showing the hub half in side elevation and half in section.

Fig. 4 is an enlarged sectional view approximately on the line 4—4 of Fig. 1.

Fig. 5 is a detail longitudinal section of a segment of the rim of the wheel, upon an enlarged scale.

Fig. 6 is a plan view of the same.

Fig. 7 is a side view of the same.

Fig. 8 is a plan view of one of the rim sections.

Fig. 9 is a perspective view of one of the rim sections, but illustrating a modification.

Fig. 10 is a perspective view of one of the spokes.

Fig. 11 is a plan view of one of the collars.

Fig. 12 is an approximately central longitudinal sectional view through the same.

Fig. 13 is a plan view of one of the caps.

Fig. 14 is an approximately central longitudinal sectional view through the same.

Fig. 15 illustrates the spring members employed with each of the spokes.

Fig. 16 is a sectional view through the rim illustrating one form of tread which may be employed.

Fig. 17 is a similar view illustrating a modified form of rim and tread.

Fig. 18 is a similar view illustrating a still further modification.

Fig. 19 is a similar view illustrating a still further modification.

Fig. 20 is a similar view illustrating a still further modification.

Fig. 21 is a detail plan view of the tread illustrated in Fig. 20.

Figure 1:
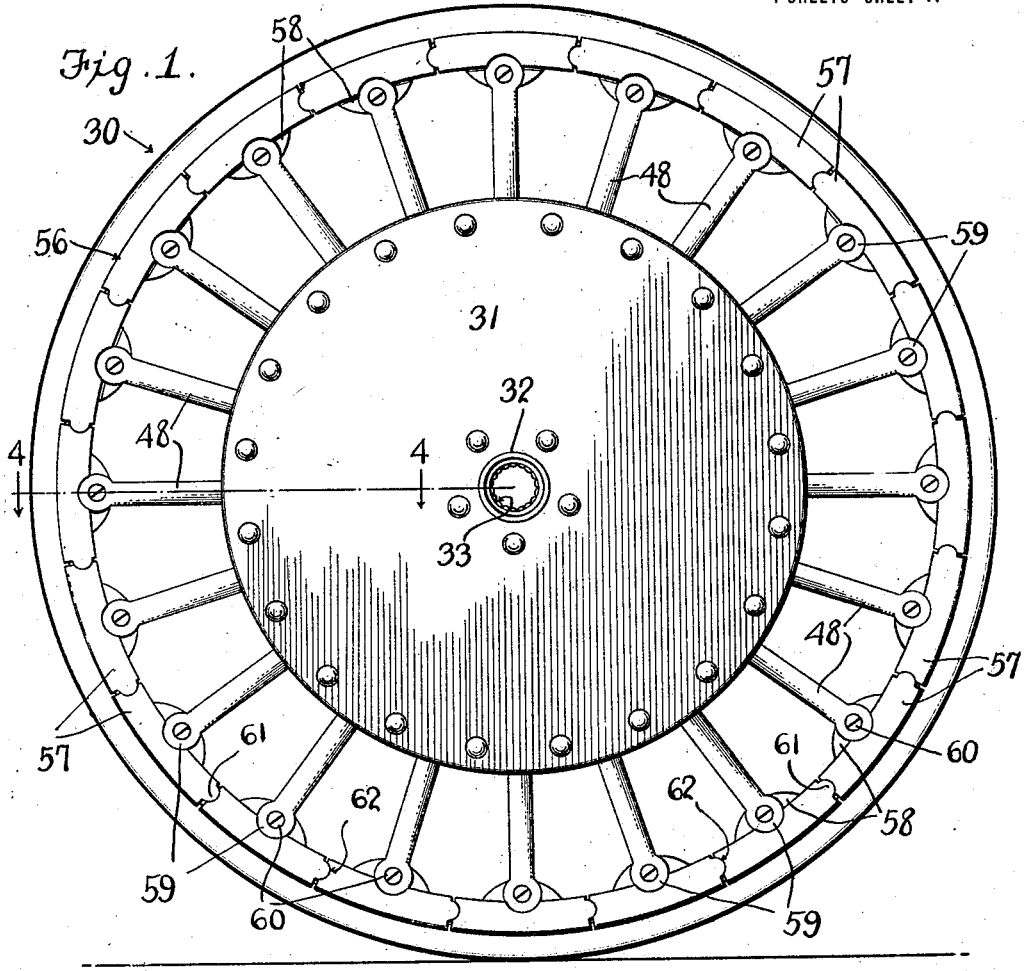
Figure 2:
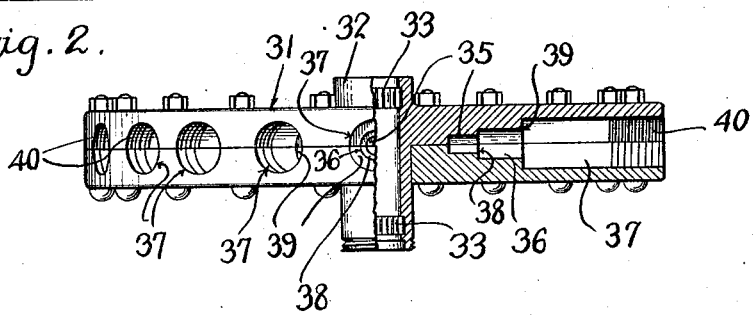
Fig. 2 is a view of the hub of the wheel, half in plan and half in central longitudinal section.

My improved resilient wheel is broadly indicated by the numerals 30.

The hub 31 of the wheel 30 may be made of one or two parts, the latter construction being illustrated by the drawings. The hub is preferably, but not necessarily provided with a box 32 within which is arranged anti-friction rollers 33 that engage, of course, with the spindle of the axle (not shown). The hub has radiating from the periphery thereof equally spaced openings providing sockets within which are received the springs and the ends of the spokes. The sockets are each provided with a bore of three dimensions, or more strictly speaking three sockets are employed for each series of springs and for each of the spokes, the smallest socket being arranged nearest the center of the hub and being designated by the numeral 35, the next larger socket being designated by the numeral 36, and the outer and largest socket is indicated by the numeral 37.

Thus a shoulder 38 is provided between the sockets 35 and 36, and a shoulder 39 is provided between the sockets 36 and 37. The socket 37 not only presents a larger bore than the sockets 36 and 35, but is provided, adjacent its outer end with threads 40 which are designed to be engaged by male threads upon the periphery of a collar or bushing 41. The collar or bushing 41, upon the outer face thereof, and outward of its bore 42 is provided with spaced depressions 43 which are designed to receive the fingers or bits of a spanner wrench whereby the collar may be adjustably arranged in the bore of the socket 37.

Before the collars or bushings are inserted in their respective sockets, I arrange in the said sockets a series of springs, three in number, each varying in length and in width, but all, however, being constructed of some high grade, and consequently strong steel so that the same are not liable to breakage. The smallest spring is indicated by the numeral 44 and is seated in the socket 35, bearing against the shoulder 45 provided by the inner wall of the said socket. This spring 44 is of a length slightly greater than the depth of the socket 35. Seated on the shoulder 38 and surrounding the outer end of the spring 44 is the next largest spring 46 which is of a greater length than the other springs. Seated on the shoulder 39 and inclosing the spring 46 is the largest and strongest spring 47.

The spokes are indicated by the numerals 48 and are each provided with reduced extensions 49, the said extensions being passed through all of the springs and contacting with the end of the smallest spring 44 in each of the sockets. On the shoulder 50 between the two diameters of each of the spokes 48 is arranged a slidable washer 50 that contacts with the outer ends of the springs 46 and 47. Each of the washers 50 is provided with a plurality of open ports 51, and the reduced end of each of the spokes 48 is provided with an air passage 52 extending longitudinally from the end thereof.

After the spokes are thus positioned the bushings or collars 41 are screwed in the sockets 37. The bushings 41 force the washers 50 against the springs 46 and 47, and the adjustment of the bushing regulates the tension of these springs. The bore of the collar loosely receives the spoke 48 so that the spoke is free to move through said collar also to provide an air passage between the bore of the collar and the spoke. After each of the collars has been screwed home I screw in the socket 37 a cap 52. This cap is provided with peripheral threads and has its outer face, outward of its bore or central opening provided with spaced depressions 53 to receive jaws or fingers of a spanner wrench. The inner face of each of the caps is provided with a depression forming a pocket 54, and in each of the pockets is arranged a compressible gasket 55 that is designed to be forced against the outer end or face of each of the collars 41 and to be compressed against the respective spokes 48.

The tire carrying rim for the wheel is broadly indicated by the numerals 56. The rim is made up of a plurality of segments 57, the cross sectional shape of which may vary, and each of the segments, upon its inner edge may be centrally provided with an ear 58 designed to receive the bifurcated outer end 59 of the spokes 48, a pivot 60 passing through the end 59 of each of the spokes and through each of the ears 58, thus loosely connecting the rim 56 to the spokes.

By reference to the drawings, it will be noted that the confronting ends of the segments comprising the rim 56 are arranged approximately centrally between each pair of spokes 48. The segments have their ends provided with outwardly extending cross sectionally round lugs or ears 61. The lugs or ears on one end of each of the segments are centrally cut away providing a socket 62. The inner wall of each of these sockets is concaved. The lug on the opposite end of each of the segments is of a length corresponding to the depression or cut away portion of the ear on the opposite end thereof. For distinction this lug or ear is indicated by the numeral 63, and the said member 57 has depressions or sockets 62 arranged laterally with respect to the lug 63. The lug 63 of one of the sections is designed to be received in the socket of the adjacent section, and the lugs on the adjacent section are received in the depressions or sockets of the coacting section. The connection between the segments is loose so that one of the said segments may be independent of the other, to a certain extent. On the turning of the wheel one end of the segment first contacting with the ground surface will have a tendency to tilt the said segment upon its pivotal connection with its respective spoke. This tilt is very slight. The segment is now brought to direct contact with the ground surface, forcing the spoke toward the hub of the wheel against the pressure of the springs. This movement will have a tendency to swing the two segments connected to the opposite ends of the segment bearing upon the ground to also force the spokes connected with the said segments inward against the pressure of their springs, so it will be noted that one segment, in ground contacting position influences the two segments connected therewith, bringing three spokes into action and the springs associated with the said spokes also into action, and thus relieving positive strain upon any one spoke and absorbing, by a plurality of springs the shock and jar to which the wheel is subjected. The inward movement of each of the spokes produces a piston-like action, compressing air in the bore of the inner socket 35, which, when the pressure upon the spoke is released, is relieved by passage through the depressions 52 in the reduced ends 49 of the spokes and the ports 51 in the washers 50.

As previously stated the cross sectional shape of the segments comprising the rim may be shaped to accommodate tires of different shapes and construction. In Fig. 16 of the drawings each of the segments comprising the rim, upon the outer face thereof is formed with two longitudinal channels providing spaced concave surfaces 65 within which are received a pair of cross sectional round continuous tread members 66. Embedded in each of the treads is a wire cable 67, the outer surface of the said cable being wrapped with a tape 68. In the said Fig. 16 of the drawings the rim segment 69 is provided with spaced ears 70 and with a depression 71 between the ears. In this instance the round outer end of the spoke 72 is received between the ears 70 entering the depression 71, a pivot 73 passing through the ears and through the spoke 72 loosely connecting the spoke to the rim.

In Fig. 17 the rim segment 74 has its edges provided with beads or flanges 75 receiving therebetween a wrapper tread 76. The outer face of the tread is flat and is provided with spaced suction cups or depressions 77. Embedded in the tire 76 is a plurality of spaced continuous wire ropes 78 having their outer surfaces wound with tapes 79.

In Fig. 18 the rim segment 80 has its edges provided with beads 81 and is formed a considerable distance inward of the beads with two longitudinal concaved depressions 82 designed to receive convex surfaces 83 upon the inner faces of the tire 84, the said tire being provided with substantially flat surfaces 85, outward of the portions 83 which rest upon the portions of the rim between the concavities 82 and the beads 81. The tire has its outer surface flat and is provided with suction depressions 86. The tire 84, adjacent its convex portions 83 has embedded therein connected ring shaped wire ropes 87 which are wound with tapes 88.

In Fig. 19 the rim segment 89 has its outer face concaved and receives therein a tread 90, which is round in cross section. The tread upon its outer surface is provided with cup shape depressions 91 and has embedded therein adjacent its inner surface a continuous wire rope 92 that is wrapped with a tape 93.

In Figs. 20 and 21 the rim segment 94 has its outer face flat and has its edges provided with beads 95. The tread 96 comprises a plurality of connected links 97, connecting elements for the series of links being in the nature of pivot bolts 98. This class of tread is particularly desirable upon wet or slippery surfaces, and all of the treads above described are sufficiently yieldable so that the same will not interfere with the free movement of the spokes, rim segments and springs in performing their functions as previously described.

From the foregoing description, when taken in connection with the drawings, the simplicity and advantages of the construction will be apparent, it is thought, without further detailed description, it should be stated, however, that all of the springs are approximately three-fourths of an inch longer than the sockets provided therefor so that the springs will hold the spokes out rigidly against the tire. The end of the spoke extends into the socket 35 not less than one-fourth of an inch when the collar is screwed in position, and before the wire ropes are embedded in the fabric or rubber they are thoroughly stretched, as otherwise they would not hold the remainder of the tire firmly against the segments of the rim.

What I claim is:

1. A wheel including a hub having radially disposed sockets providing bores of three dimensions, the outer portions of the sockets being longer and of a greater circumference than the intermediate portions thereof and the said intermediate portions being longer and of greater circumference than the inner portions thereof, springs of varying tensional strength and lengths in the respective bores of the sockets, the smallest and shortest series of springs being wholly received in the inner bores of the sockets, the longest springs having their ends resting on the shoulders between the inner and intermediate bores but extending into the longest series of bores and the strongest series of springs being received in the outermost bores of the sockets resting on the shoulders between the outer and intermediate bores and surrounding the last mentioned series of springs, spokes, each of said spokes having a reduced end received in the smallest bore of the respective socket and contacting with the spring in the said bore, a perforated washer on each of the spokes contacting with the remaining springs in the socket in which the said spoke is received, and bushings in the outer bores of the sockets each receiving therethrough a spoke and contacting with the referred to washer on the spoke.

2. A wheel having a sectional hub provided with radially disposed sockets having the bores thereof of different lengths and diameters, the outer and largest bores being threaded from the ends thereof, springs of different diameters, lengths and tensional strengths arranged in the respective bores of the sockets and contacting with the inner walls of the bores, spokes having reduced inner ends of a length less than the depth of the sockets, received in said sockets and having the ends thereof contacted by the inner and smallest spring in the sockets, a washer on each of the spokes normally contacting with the shoulder provided by the reduced end of the spoke, and said washers being engaged by the remaining springs in the sockets that receive the spokes, and bushings threaded in the outer bores of the sockets and the said spokes passing through said bushings.

In testimony whereof I affix my signature.

EDWARD W. CONNESS.